W. B. MURRAY.
APPARATUS FOR CUTTING OFF THE MOTIVE POWER OF AN ENGINE OR THE LIKE AND APPLYING THE BRAKES.
APPLICATION FILED OCT. 16, 1911.
1,180,788.
Patented Apr. 25, 1916.
4 SHEETS—SHEET 3.
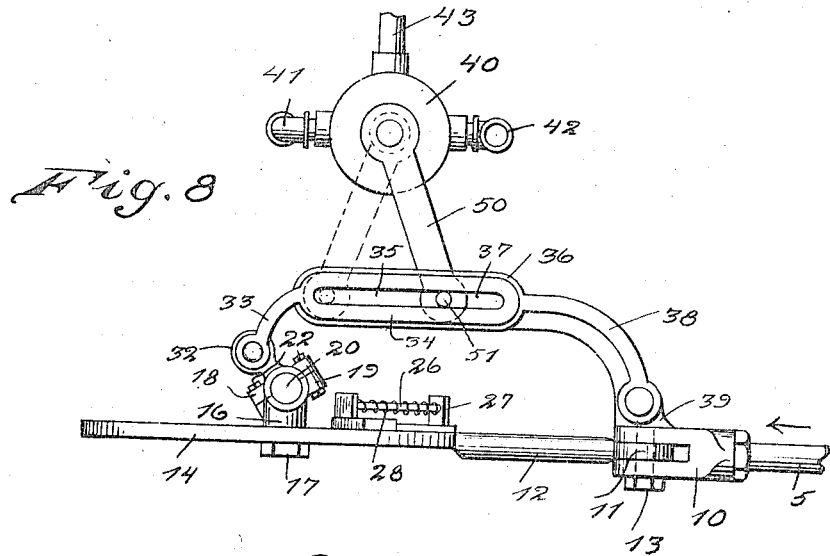
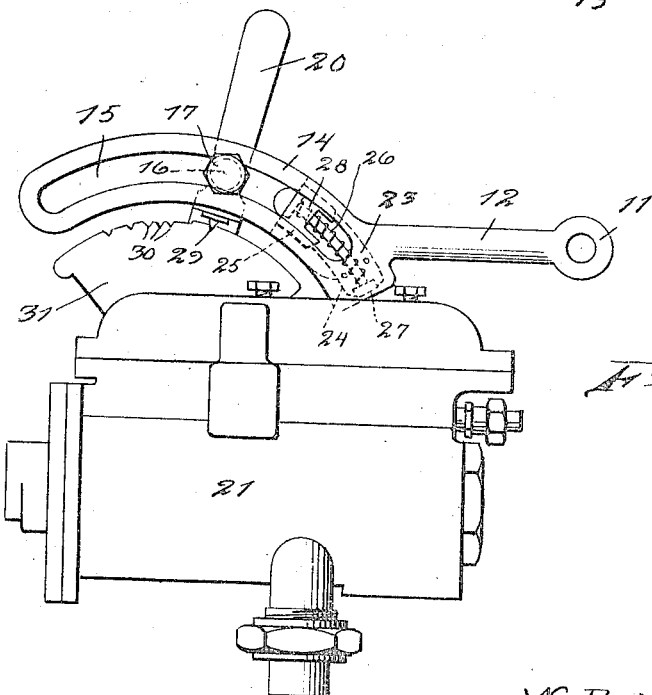
Witnesses
J. Milton Jester
R. V. Muhlman
Inventor
W. B. Murray.
By
C. L. Parker
Attorney W. B. MURRAY.
APPARATUS FOR CUTTING OFF THE MOTIVE POWER OF AN ENGINE OR THE LIKE AND APPLYING THE BRAKES.
APPLICATION FILED OCT. 16, 1911.

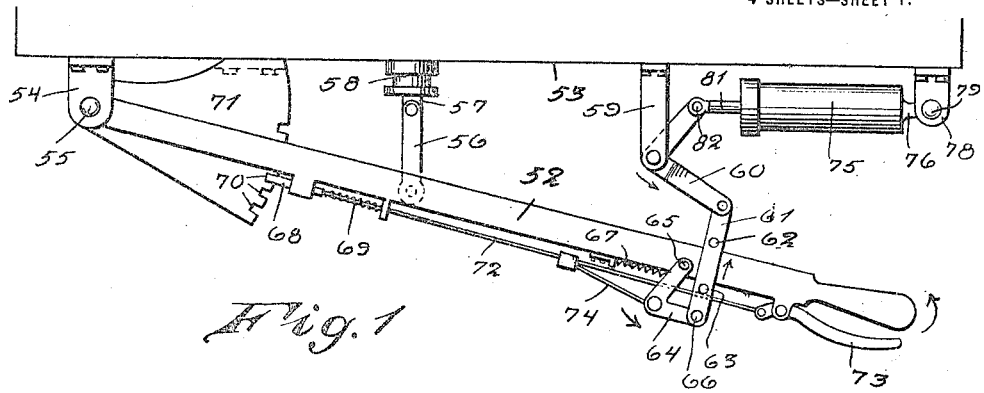
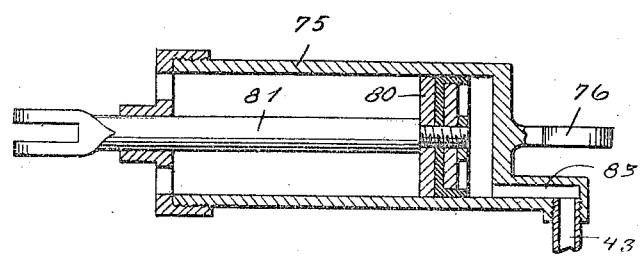
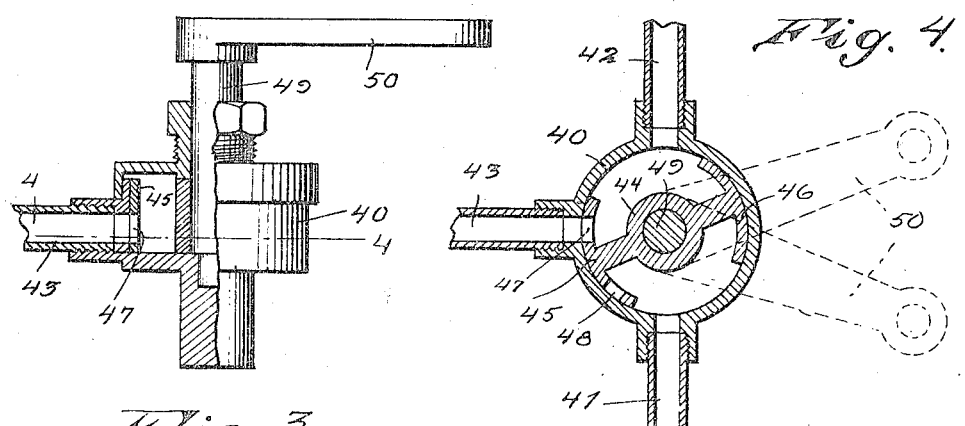

1,180,788.

Patented Apr. 25, 1916.
4 SHEETS—SHEET 4.

Witnesses
J. Milton Jesler
B. F. Fishburne

Inventor
W. B. Murray

By C. L. Parker
Attorney

UNITED STATES PATENT OFFICE.

WILLIAM B. MURRAY, OF WASHINGTON, DISTRICT OF COLUMBIA, ASSIGNOR TO THE MILLER TRAIN CONTROL CORPORATION, OF STAUNTON, VIRGINIA, A CORPORATION OF VIRGINIA.

APPARATUS FOR CUTTING OFF THE MOTIVE POWER OF AN ENGINE OR THE LIKE AND APPLYING THE BRAKES.

1,180,788.          Specification of Letters Patent.      Patented Apr. 25, 1916.

Original application filed July 12, 1911, Serial No. 638,108. Divided and this application filed October 16, 1911. Serial No. 655,016.

*To all whom it may concern:*

Be it known that I, WILLIAM B. MURRAY, a citizen of the United States, residing at Washington, in the District of Columbia, have invented certain new and useful Improvements in Apparatus for Cutting Off the Motive Power of an Engine or the like and Applying the Brakes, of which the following is a specification.

The subject matter of this invention is shown and described in my pending application for mechanically operated and electrically controlled train control system, Serial No. 638,108, filed July 12, 1911, of which the present application is a divisional application but the present invention is not claimed therein.

The present invention relates to means for cutting off the motive power of an engine, street car or the like and applying the brakes for stopping the same.

An important object of this invention is to provide apparatus of the above mentioned character, which is positive in operation and not liable to derangements.

A further object of this invention is to provide novel means for actuating the latch mechanism of the throttle lever and subsequently moving the throttle lever for cutting off the supply of steam.

A further object of my invention is to provide novel means for actuating the brake valve, whereby after the brakes have been applied they will remain so until the engineer manually operates the brake valve.

Other objects and advantages of this invention will be apparent during the course of the following description.

Figure 5:
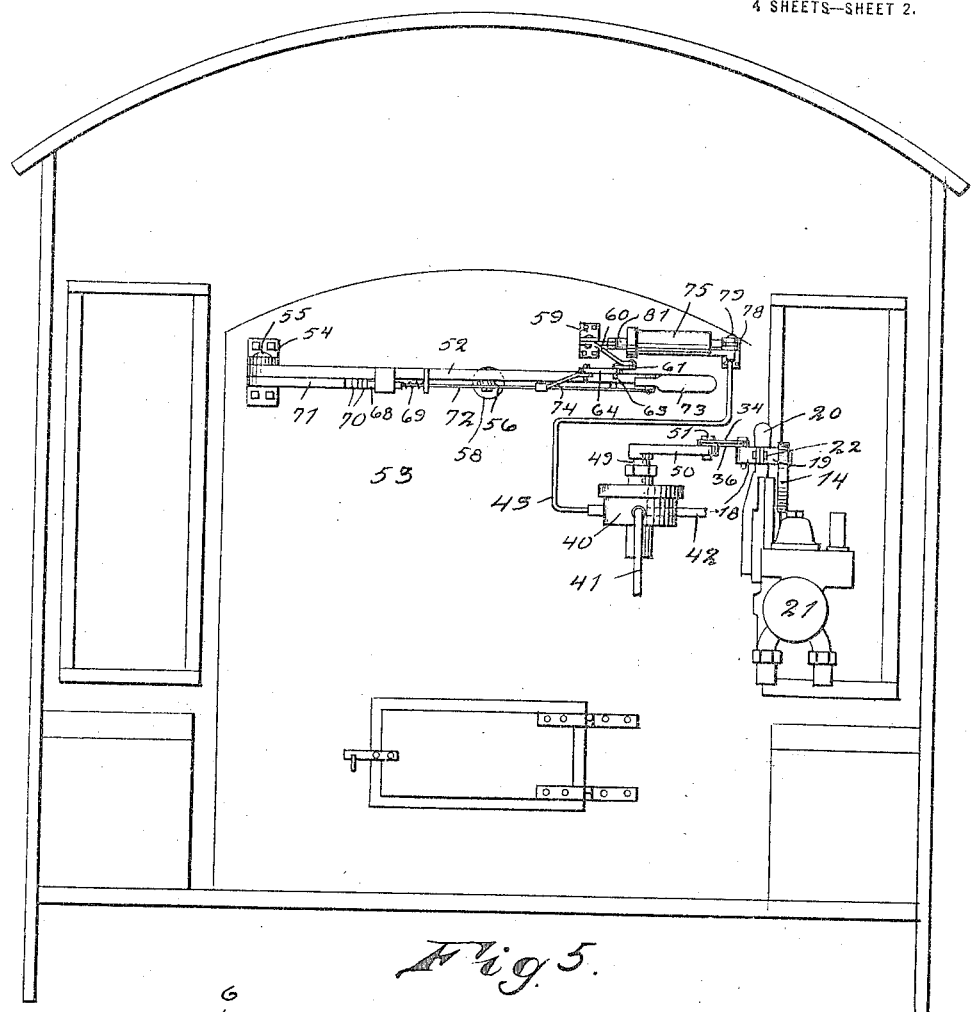
Figure 6:
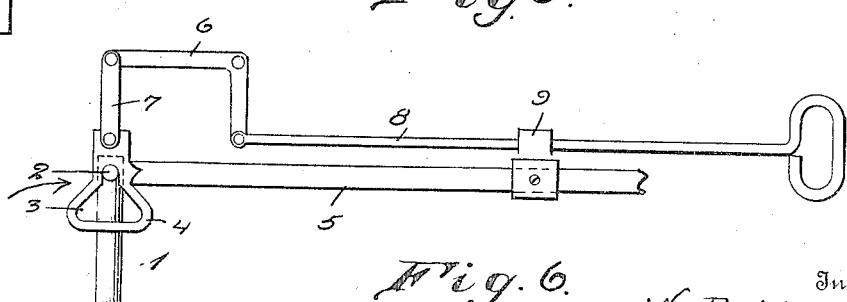
Figure 10:
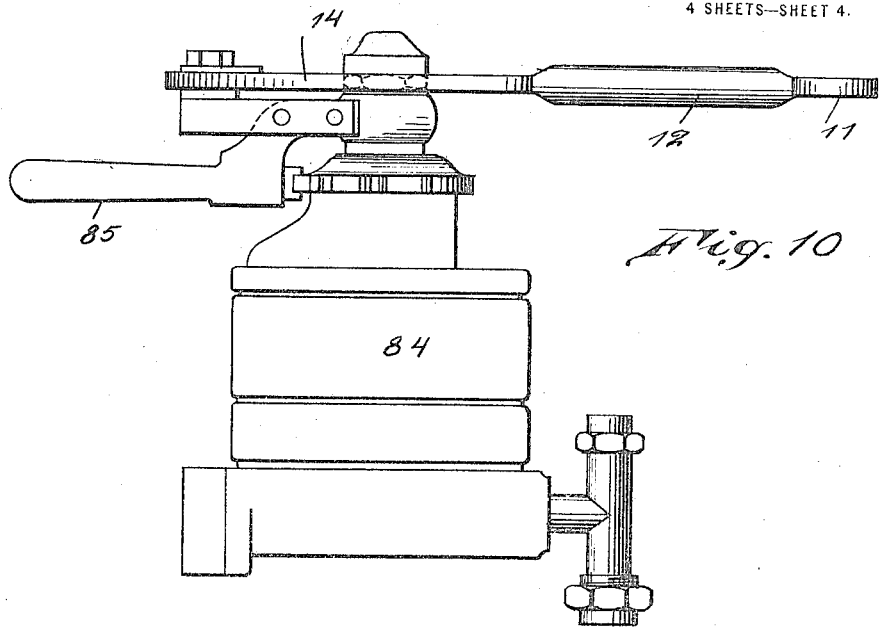
Figure 9:
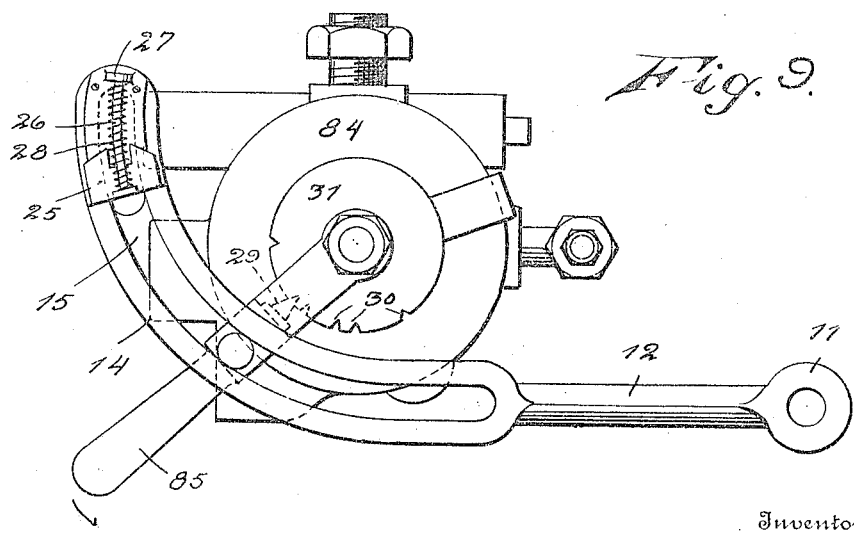

In the accompanying drawings forming a part of this specification and in which like numerals are employed to designate like parts throughout the same, Figure 1 is a plan view of a throttle lever of a railway locomotive, showing my improved apparatus for operating the same, Fig. 2 is a central vertical longitudinal sectional view through a cylinder included in the throttle lever operating apparatus, Fig. 3 is a side view partly in section of a three-way valve structure, Fig. 4 is a horizontal sectional view taken on line 4—4 of Fig. 3, Fig. 5 is a rear end view of the boiler of the locomotive, showing my throttle lever operating apparatus and brake valve operating apparatus, Fig. 6 is a fragmentary side view of a rod which operates the apparatuses shown in Fig. 5, Fig. 7 is a side view of a New York air brake valve, showing my improved apparatus for operating the controlling lever of the same, Fig. 8 is a plan view of the operating apparatus shown in Fig. 7, the air brake valve being omitted and showing means attached to the apparatus for operating the three-way valve structure, Fig. 9 is a plan view of a Westinghouse air brake valve, showing my apparatus for operating the controlling lever, and, Fig. 10 is a side view of the same.

In the drawings wherein is illustrated a preferred embodiment of my invention, the numeral 1 designates a pivoted vertically swinging lever, which is moved by the mechanically operated and electrically controlled apparatus shown and described in my above referred to application, Serial No. 638,108 filed July 12, 1911. The lever 1 carries a laterally extending pin 2 at its upper end, operating within an opening 3 formed in a head 4, which is formed upon a push-rod 5, extending into the engine cab. The head 4 may be raised and lowered by swinging a bell-crank lever 6 pivoted to the frame-work of the engine and connected with the head through the medium of a link 7. The bell-crank lever 6 is moved by a reciprocatory rod 8, operating in a bracket 9 carried by the push-rod 5. The pin 2 is normally positioned within the upper small vertical portion of the opening 3, whereby a swinging movement of the lever 1 will effect a longitudinal movement of the push-rod 5. When, however, the head 4 is swung upwardly, the pin 2 will operate within the lower large portion of the opening 3, whereby the movement of the swinging lever 1 will not be imparted to the upper push-rod.

The push-rod 5 has one end thereof suitably connected with a coupling 10 (see Figs.

7 and 8), which coupling is bifurcated to receive an apertured head 11 carried by a rigid shaft 12, the head 11 being pivotally connected with the coupling 10 by a bolt 13. Rigidly attached to the free end of the shaft 12 is a segment 14, provided with a curved slot 15, to slidably receive a reduced portion of a pin 16, having the extreme outer portion thereof screw-threaded for receiving a nut 17. The pin 16 carries upon one end a clamp formed of two parts, 18 and 19, engaging an operating lever 20 of a New York air brake valve 21. The parts 18 and 19 are held together by bolts 22 or the like. Mounted upon the segment 14 and adjacent the shaft 12 is a plate 23, held fast to the segment by screws 24, and adapted to be adjusted longitudinally of the segment to permanently regulate the amount of pressure to be employed when applying the brakes. Slidably mounted upon the plate 23 is a stop 25, having a lug formed thereon for connection with a curved rod 26, having one end slidable through a lug 27. Surrounding the rod 26 is a compressible coil spring 28, to oppose the movement of the stop 25 in that direction. When the segment 14 is moved longitudinally to the left sufficiently, stop 25 engages the pin 16 and swings the lever 20 to operate the valve structure 21 for applying the brakes. The spring 28 takes up all undue shocks. The lever 20 carries a latch device 29, to fit within a selected one of the notches 30 of a segment 31, whereby after the lever has been swung to apply the brakes it will be held in its new position until it is manually moved by the engineer, since the return movement of the segment 14 does not swing the lever 20.

The part 18 of the above referred to clamp is provided with an ear 32, to which is pivoted a curved arm 33, carrying at one end a plate 34, provided with an elongated slot 35. Disposed below and in slidable engagement with the plate 34 is a separate plate 36, having an elongated slot 37 formed therethrough and adapted to register with the slot 35. The plate 36 is formed upon one end of a curved arm 38, which is pivotally connected with an ear 39 carried by the coupling 10.

The numeral 40 designates a three-way valve structure (see Figs. 3 and 4) comprising an outer casing provided with a pressure supply pipe 41, an exhaust pipe 42 and a cylinder pipe 43. Mounted to oscillate within the casing 40 is a valve 44 including segmental plates 45 and 46, the plate 45 being provided with openings 47 and 48. When the opening 47 is in registration with the opening of the pipe 43 communication is had between the pipe 43 and the exhaust pipe 42. When the opening 48 is in registration with the opening of the pipe 43, communication is established between pipes 43 and 41, to supply compressed air to the pipe 43, it being understood that the pipe 41 has communication with a source of compressed air. The valve 44 is rigidly mounted upon a pivoted stem 49, extending through the upper portion of the shell 40 and having rigid connection with a lever 50. As clearly shown in Fig. 8, the lever 50 carries an upstanding pin 51 at its outer end, which pin is disposed to operate within the slots 35 and 37. When the lever 50 occupies the position shown in Fig. 8, communication is had between pipes 42 and 43. Upon sufficient longitudinal movement of the push-rod 5 in the direction of the arrow, the end wall of slot 35 engages the pin 51, to oscillate the lever 50 until the same assumes its other position shown in dotted lines, whereupon compressed air will be fed from pipe 41 into pipe 43.

Attention is now called more particularly to Figs. 1 and 2, wherein 52 designates a throttle lever of the engine, which is mounted near the end or face 53 of the boiler. One end of the throttle lever 52 is pivoted with a fixed bracket 54, as shown at 55, said bracket being rigidly attached to the face 53. The throttle lever 52 is pivotally connected intermediate its ends with a link 56, having connection with a valve stem 57, which operates through a stuffing box 58. Rigidly attached to the face 53 of the boiler and positioned between the same and the throttle lever 52 is a fixed bracket 59, to the outer end of which is pivoted a bell-crank lever 60, as shown. A link 61 has pivotal connection with the outer arm of the bell-crank lever 60 and is disposed above and adjacent the throttle lever 52. This link carries spaced pins 62 and 63 disposed upon opposite sides of the throttle lever, as shown. A bell-crank lever 64 is pivotally mounted upon the throttle lever, as shown at 65 and has its opposite end pivotally connected with the link 61 by a bolt 66. The pin 63 is normally spaced from the throttle lever 52, whereby when the link 61 is first moved in the direction of the arrow, the bell-crank lever 64 is swung, subsequent to which the pin 63 engages the throttle lever 52 to swing the same inwardly in the direction of the arrow. A spring 67 tends to hold the bell-crank lever 64 against movement.

The numeral 68 designates a latch suitably mounted upon the throttle lever 52 and urged in one direction by a spring 69. This latch coöperates with teeth 70 formed upon a stationary segment 71, as shown. The latch 68 is adapted to lock the throttle lever 52 in adjustment at different positions and said latch is moved by a rod 72, connected with a hand-grip 73, which is pivotally connected with the throttle lever near its outer end. The rod 72 is connected with the bell-crank lever 64 through the medium of a link 74.

As clearly shown in Figs. 1, 2 and 5, a horizontal cylinder 75 is provided, the same being disposed near the face 53 and provided at one end thereof with an apertured ear 76, which is pivoted to a stationary bracket 78, through the medium of a bolt 79. Within the cylinder 75 is mounted to reciprocate a piston 80 having connection with a rod 81, that has its outer end bifurcated to receive the inner arm of the bell-crank lever 60 and be pivotally connected therewith by a bolt 82. The pipe 43 has suitable connection with a pipe 83, which leads into the inner end of the cylinder 75. This connection is such that it does not interfere with the slight swinging movement of the cylinder 75.

Instead of employing the New York air brake valve hereinabove referred to, I may employ the standard Westinghouse air brake valve, shown in Figs. 9 and 10, and designated as a whole by the numeral 84. When the brakes are applied the lever 85 is moved in the direction of the arrow, which is in a reverse direction to the brake applying movement of the lever 20 forming a part of the New York air brake valve. The means attached to the lever 85 for moving the same is just like that shown in Figs. 7 and 8, except that the stop 25 is arranged adjacent the opposite end of the segment 14, because said means are pulled or moved in a reverse direction to operate this form of valve. The push-rod 5 must now be moved in a reverse direction, and this is accomplished by means which are fully described and shown in my above referred to pending application. The same three-way valve structure and means connecting the same with the segment 14 are provided, except that the three-way valve structure will have to be constructed to supply compressed air to the pipe 43 when the lever 50 is swung to the right or in a reverse direction. The apparatus actuated by the three-way valve structure to operate the throttle lever remains the same.

The operation of the apparatus is as follows: When the swinging lever 1 is moved rearwardly or in the direction of the arrow, the stop 25 will engage the pin 16 and swing the lever 20 to operate the air brake valve, for applying the brakes. The means attached to the shaft 12 and the segment 14 for operating the three-way valve structure 40 are moved, whereby the valve structure is operated and compressed air supplied through pipes 41 and 43 into the cylinder 75. The piston 80 is now moved to the left and the bell-crank lever 60 through the medium of the link 62 causes the bell-crank lever 64 to swing in the direction of its arrow. This movement of the bell-crank lever 64 moves the rod 72 longitudinally to release the latch 68. Subsequently to this the bell-crank lever 60 brings the pin 63 into engagement with the throttle lever 52 whereby the latter is swung to cut off the supply of steam.

From the description of the above referred to parts, it is obvious that means are provided for cutting off the supply of steam and applying the brakes. The steam remains cut off and the brakes stay on until the engineer manually returns the lever 20 to its normal position, for when the mechanically operated and electrically controlled apparatus returns to its normal position, it causes the push-rod 5 to move forwardly in a reverse direction, carrying with it coupling 10, shaft 12, segment 14, and arm 38, but not moving the arm 33, whereby lever 50 will not be moved. When the engineer desires to remove the brakes, he swings the lever 20 to the right until the same assumes its normal position as shown in Fig. 7. Upon this movement of the lever 20, the left end wall of the slot 35 engages the pin 51, whereby the lever 50 is returned to its normal position and the supply of compressed air cut off from the cylinder 75 and the cylinder placed in communication with the atmosphere. The engineer may then manually operate the throttle lever 2 for starting the engine.

I wish it understood that the form of my invention herewith shown and described is to be taken as a preferred example of the same and that certain changes in the shape, size and arrangement of parts may be resorted to without departing from the spirit of the invention or the scope of the subjoined claims.

Having thus described my invention, I claim:—

1. In apparatus of the character described, means for controlling the supply of motive power including a movable lever, means for operating the movable lever including a cylinder and a piston operating therein, a valve structure for controlling the supply of pressure within the cylinder, brake actuating mechanism, connecting means between said valve structure and brake actuating mechanism, and means to operate the brake actuating mechanism.

2. In apparatus of the character described, means for controlling the supply of motive power, means for operating the same including a cylinder and a piston operating therein, a valve structure for controlling the supply of pressure to the cylinder, a lever to operate the valve structure, a pin carried by said lever, a plurality of relatively movable plates having registering slots to receive the pin, and means to move said plates.

3. In apparatus of the character described, means for controlling the supply of motive power, means for operating the same including a valve structure, a lever to operate the valve structure, brake actuating mechanism, means to operate the brake actuating mechanism, means to operate said lever, and common means to move the second and third named means.

4. In apparatus of the character described, the combination with the throttle lever of an engine, of pressure operated means to move the throttle lever to its closed position, a valve for controlling the passage of pressure to the pressure operated means, an engineer's air brake valve, and common means to operate the engineer's air brake valve and the first named valve.

5. In an apparatus of the character described, a throttle lever, a latch to normally hold the same against movement, an element connected with the throttle lever to move the latch, a link connected with the element, a swinging lever connected with said link, a pivoted cylinder adapted to be bodily swung, a piston operating in the cylinder, a piston rod connected with the piston and swinging lever, and means to supply pressure into the cylinder.

6. In apparatus of the character described, the combination with a pair of pivoted levers, of a plurality of relatively movable members for moving one lever, means for connecting one member with the other lever, means to move the last named lever, and means to move the other member.

7. In apparatus of the character described, a throttle lever, a cylinder, a piston operating therein, connecting means between the piston and throttle lever, a valve structure to control the passage of pressure into the cylinder, an air brake valve, and common means to operate the valve structure and air brake valve.

8. In apparatus of the character described, the combination with a lever of an air brake valve, of a laterally extending element attached thereto, a plate provided with a slot for receiving the laterally extending element, a stop mounted in the slot of said plate, a spring to yieldingly oppose the movement of the stop in one direction, and means to move the plate.

9. In apparatus of the character described, the combination with a lever of an air brake valve, of a laterally extending element attached thereto, a plate provided with means to engage the laterally extending element to move the same, means for cutting off the motive power, apparatus to actuate said means including a valve and its lever, means connected with the plate for operating the last named lever, and means to move said plate.

10. In apparatus of the character described, means for cutting off the motive power, brake actuating mechanism including a lever, apparatus to operate said means including a valve structure, and common means to operate the lever and valve structure, when moved in one direction and adapted to allow said lever to remain in its set position for applying the brakes.

11. In apparatus of the character described, the combination with the throttle lever of an engine, of a cylinder, a piston disposed therein, operating connecting means between the piston and the throttle lever, means for supplying pressure to the cylinder including a valve, mechanically operated mechanism, connecting means between the mechanically operated mechanism and the valve, and means to render the connecting means inoperative.

12. In apparatus of the character described, means for cutting off the motive power, a movable rod for actuating said means and provided with an enlarged head having an opening formed therein which has large and contracted portions, an operating element disposed within the head, and manually operated means to bring the operating element within the large portion of the opening of said head.

13. In apparatus of the character described, means for cutting off the motive power, a movable element for actuating said means, an operating element to move the first named element and normally having operative connection therewith, and manually operated means to break the operative connection between the movable element and operating element.

14. In apparatus of the character described, brake actuating means, a movable element to operate said brake actuating means, an operating element to move the first named element and normally having operative connection therewith, and manually operated means to break the operative connection between the movable element and operating element.

15. In apparatus of the character described, an engineer's air brake valve, a movable handle to operate the same provided with a laterally extending pin, a reciprocatory member provided with a longitudinal slot to receive the pin, a yielding shock absorbing member carried by the reciprocatory member to engage with the laterally extending pin, and means to move the reciprocatory member.

16. In apparatus of the character described, an engineer's air brake valve, a pivoted lever to operate the same and provided with a lateral extension, and a reciprocatory member to shift the lever when moved in one direction only and carrying yielding shock absorbing means to engage with the lateral extension upon being moved in one direction.

17. The combination with a lever having an extension, of a pair of longitudinally slotted plates receiving the extension in their slots and movable with relation to each other, a second lever having operative connection with one slotted plate, a mechanically operated element to shift the second named lever, and connecting means between the other slotted plate and the mechanically operated element.

In testimony whereof I affix my signature in presence of two witnesses.

WILLIAM B. MURRAY.

Witnesses:
HARVEY B. MILLER,
C. L. PARKER.